(12) United States Patent
Doerre et al.

(10) Patent No.: US 10,455,215 B2
(45) Date of Patent: Oct. 22, 2019

(54) SYSTEM, METHOD, AND RECORDING MEDIUM FOR A CLOSED-LOOP IMMERSIVE VIEWING TECHNOLOGY COUPLED TO DRONES

(71) Applicant: International Business Machines Corporation, Armonk, NY (US)

(72) Inventors: George W. Doerre, Yorktown Heights, NY (US); Michael S. Gordon, Yorktown Heights, NY (US); James R. Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 398 days.

(21) Appl. No.: 15/189,141

(22) Filed: Jun. 22, 2016

(65) Prior Publication Data
US 2017/0374351 A1    Dec. 28, 2017

(51) Int. Cl.
| | |
|---|---|
| *H04N 13/239* | (2018.01) |
| *H04N 13/344* | (2018.01) |
| *H04N 13/296* | (2018.01) |
| *B64C 39/02* | (2006.01) |
| *B64D 47/08* | (2006.01) |
| *G05D 1/00* | (2006.01) |

(52) U.S. Cl.
CPC ......... *H04N 13/239* (2018.05); *B64C 39/024* (2013.01); *B64D 47/08* (2013.01); *G05D 1/0016* (2013.01); *G05D 1/0027* (2013.01); *H04N 13/296* (2018.05); *H04N 13/344* (2018.05); *B64C 2201/127* (2013.01)

(58) Field of Classification Search
CPC ............. H04N 13/0239; H04N 13/044; H04N 13/344; H04N 13/239; B64C 39/024; B64D 47/08; G05D 1/0027; G05D 1/0016
USPC ................................. 701/23, 2; 348/47, 143
See application file for complete search history.

(56) References Cited

U.S. PATENT DOCUMENTS

| | | | |
|---|---|---|---|
| 9,350,954 B2* | 5/2016 | Wagreich ............. | G05D 1/0038 |
| 2015/0346722 A1* | 12/2015 | Herz .................... | G05D 1/0038 701/2 |
| 2016/0035224 A1* | 2/2016 | Yang .................. | H04B 7/18506 701/23 |
| 2016/0054837 A1* | 2/2016 | Stafford ................ | A63F 13/825 463/33 |
| 2016/0295038 A1* | 10/2016 | Rao ......................... | G06F 3/005 |

(Continued)

*Primary Examiner* — Michael E Teitelbaum
*Assistant Examiner* — Sean N. Haiem
(74) *Attorney, Agent, or Firm* — Rahan Uddin, Esq.; McGinn IP Law Group, PLLC

(57) ABSTRACT

A viewing technology method, system, and non-transitory computer readable medium including a display device associated with a user and at least two drones having an image capturing device, include a drone control circuit configured to control a flight path of the at least two drones such that the drones are separated by the inter-drone distance, a vergence angle determining circuit configured to determine a vergence angle of the pupils of the user relative to the image displayed on the display device, and a image control circuit configured to control a display of the image on the display device according to the vergence angle to cause the image to create a just-noticeable-difference in the image.

20 Claims, 5 Drawing Sheets

(56) References Cited

U.S. PATENT DOCUMENTS

| | | | |
|---|---|---|---|
| 2016/0306351 A1* | 10/2016 | Fisher | H04W 4/70 |
| 2016/0349849 A1* | 12/2016 | Kwon | G06F 3/011 |
| 2017/0078653 A1* | 3/2017 | Bi | G06T 3/0062 |
| 2017/0220037 A1* | 8/2017 | Berestov | G05D 1/0027 |
| 2017/0247108 A1* | 8/2017 | Ljubuncic | B64C 39/024 |

* cited by examiner

SYSTEM, METHOD, AND RECORDING MEDIUM FOR A CLOSED-LOOP IMMERSIVE VIEWING TECHNOLOGY COUPLED TO DRONES

BACKGROUND

The present invention relates generally to a viewing technology system, and more particularly, but not by way of limitation, to a system for a closed-loop immersive viewing technology (VR) coupled to drones flying in formation to provide unique stereopsis cues to the viewer of the scene through viewing screens attached to the eyes and separated by a normal inter-ocular distance.

Conventional technology between a drone equipped with a camera and a user considers using wearable goggles with head tracking to control an operation of a drone. The conventional techniques monitor a head movement and sends these signals to a drone. The camera on the drone follows the same orientation as the head does. That is, if the user's head look ups then the camera looks up. If the user looks to the left or to the right the camera follows and so forth. However, the conventional techniques only control a single drone based on a movement of the user, without considering generating a stereoscopic image using multiple drones through the wearables.

Conventional stereoscopic image creating techniques consider photographing a scene with a camera spaced from the scene, moving the camera generally parallel to the scene while producing a plurality of pictures of the scene each taken at a different position relative to the scene, and separating the pictures into stereo pairs for viewing. Photographing and moving steps can be performed and the separating step can be done as soon as the pictures are available for viewing to produce the stereo pairs. However, these conventional techniques use a single camera and images taken at different times to create a stereoscopic image, and do not consider at least two cameras concurrently taking images to create a stereoscopic image with an illusion of depth and scale.

SUMMARY

In view of the technical problems in the conventional techniques, the inventors have considered a non-abstract improvement to a computer technology via a technical solution to the technical problem in which a system that leverages at least two drones equipped with an imaging device each, and a coupling between cameras and a screen of a binocular closed-loop immersive viewing technology (VR) viewing device. The drones connected to the system fly at a distance from each other configured by the user which sets a scale of a model illusion of a landscape. Pupil tracking provides feedback to the drones on relative angle which the drones achieve to match the vergence angle of the user's eyes. Based on the scale and the vergence angle, image processing can provide a variable depth of field via color saturation, blurring of the image, or other cues for reinforcing the scale model illusion.

In an exemplary embodiment, the present invention can provide a viewing technology system including a display device associated with a user and at least two drones having an image capturing device, the system includes a drone separation calculating circuit configured to calculate an inter-drone distance between the at least two drones to create an image at a predetermined scale based on a relationship between the inter-drone distance and an inter-ocular distance between pupils of the user, a drone control circuit configured to control a flight path of the at least two drones such that the drones are separated by the inter-drone distance, a vergence angle determining circuit configured to determine a vergence angle of the pupils of the user relative to the image displayed on the display device, and a image control circuit configured to control a display of the image on the display device according to the vergence angle to cause the image to create a just-noticeable-difference in the image.

Further, in another exemplary embodiment, the present invention can provide a viewing technology method including a display device associated with a user and at least two drones having an image capturing device, the method including calculating an inter-drone distance between the at least two drones to create an image at a predetermined scale based on a relationship between the inter-drone distance and an inter-ocular distance between pupils of the user, controlling a flight path of the at least two drones such that the drones are separated by the inter-drone distance, determining a vergence angle of the pupils of the user relative to the image displayed on the display device, and controlling a display of the image on the display device according to the vergence angle to cause the image to create a just-noticeable-difference in the image.

Even further, in another exemplary embodiment, the present invention can provide a non-transitory computer-readable recording medium recording a viewing technology program including a display device associated with a user and at least two drones having an image capturing device, the program causing a computer to perform: calculating an inter-drone distance between the at least two drones to create an image at a predetermined scale based on a relationship between the inter-drone distance and an inter-ocular distance between pupils of the user, controlling a flight path of the at least two drones such that the drones are separated by the inter-drone distance, determining a vergence angle of the pupils of the user relative to the image displayed on the display device, and controlling a display of the image on the display device according to the vergence angle to cause the image to create a just-noticeable-difference in the image.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
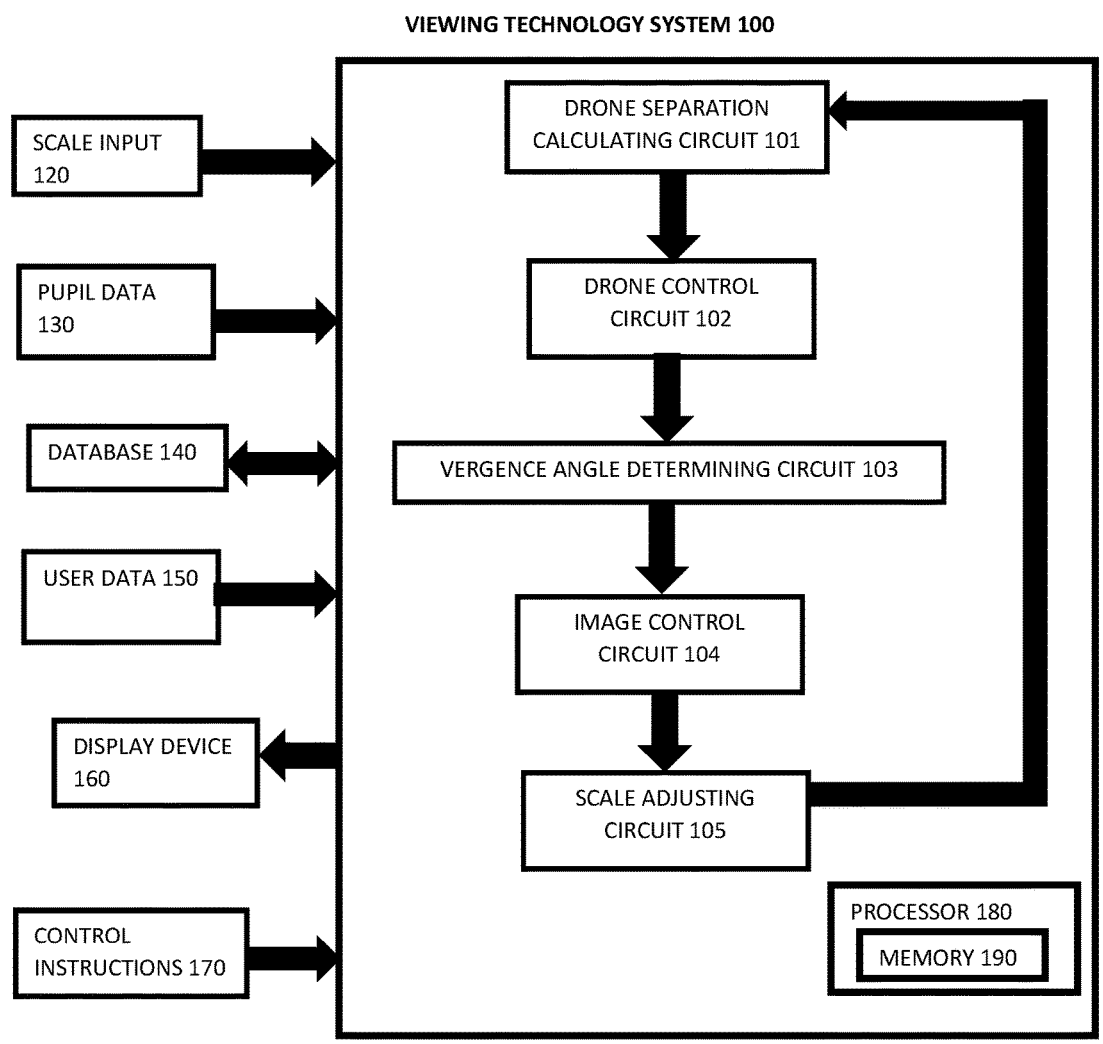
FIG. 1 exemplarily shows a block diagram illustrating a configuration of a viewing technology system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the viewing technology system 100 includes a drone separation calculating circuit 101, a drone control circuit 102, a vergence angle determining circuit 103, an image control circuit 104, and a scale adjusting circuit 105. The viewing technology system 100 includes a processor 180 and a memory 190, with the memory 190 storing instructions to cause the processor 180 to execute each circuit of the viewing technology system 100. The processor and memory may be physical hardware components, or a combination of hardware and software components.

Although the viewing technology system 100 includes various circuits, it should be noted that a viewing technology system can include modules in which the memory 190 stores instructions to cause the processor 180 to execute each module of the viewing technology system 100.

Also, each circuit can be a stand-alone device, unit, module, etc. that can be interconnected to cooperatively produce a transformation to a result.

Figure 3:
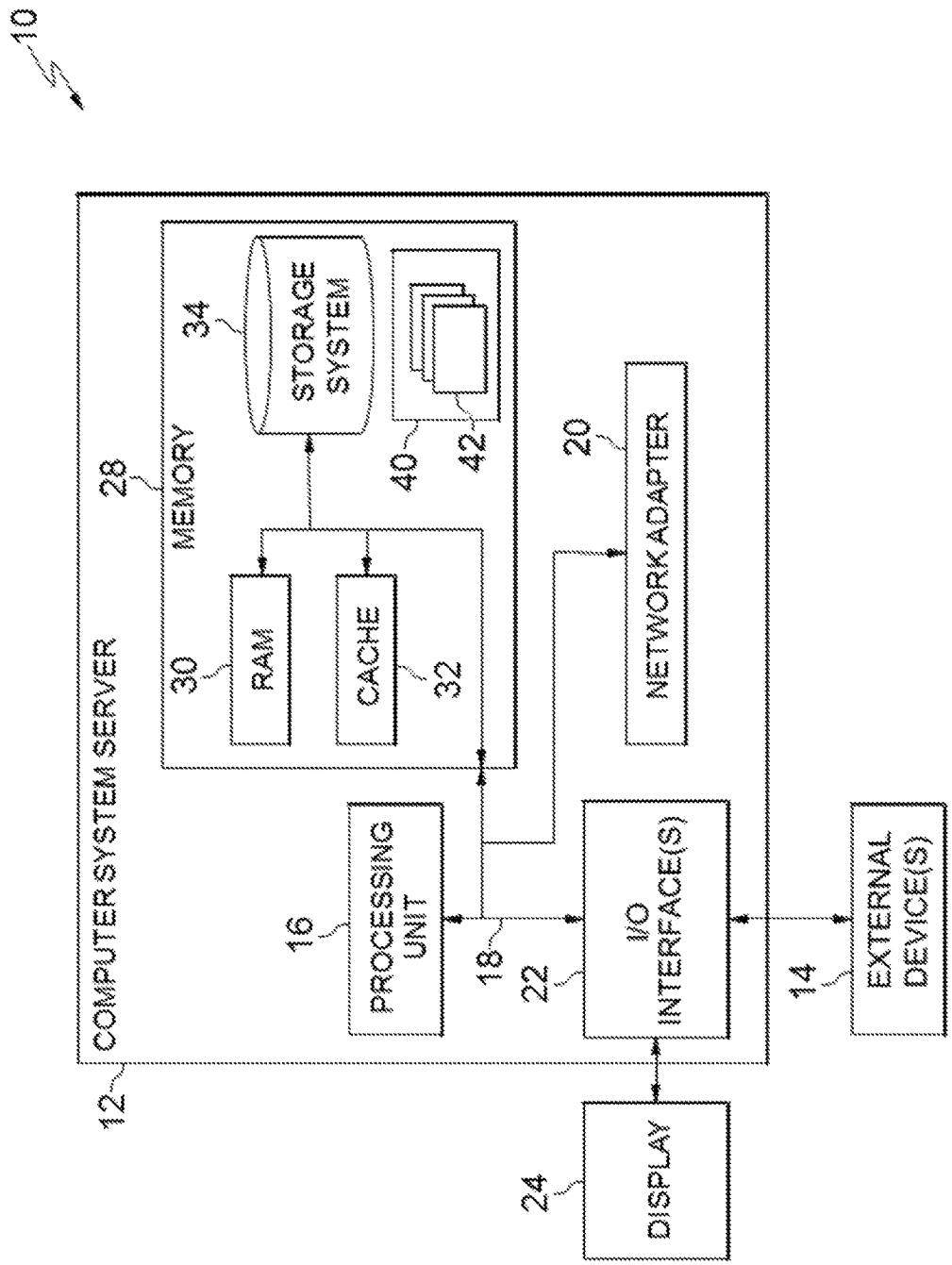
FIG. 3 depicts a cloud computing node 10 according to an exemplary embodiment of the present invention.
Figure 4:
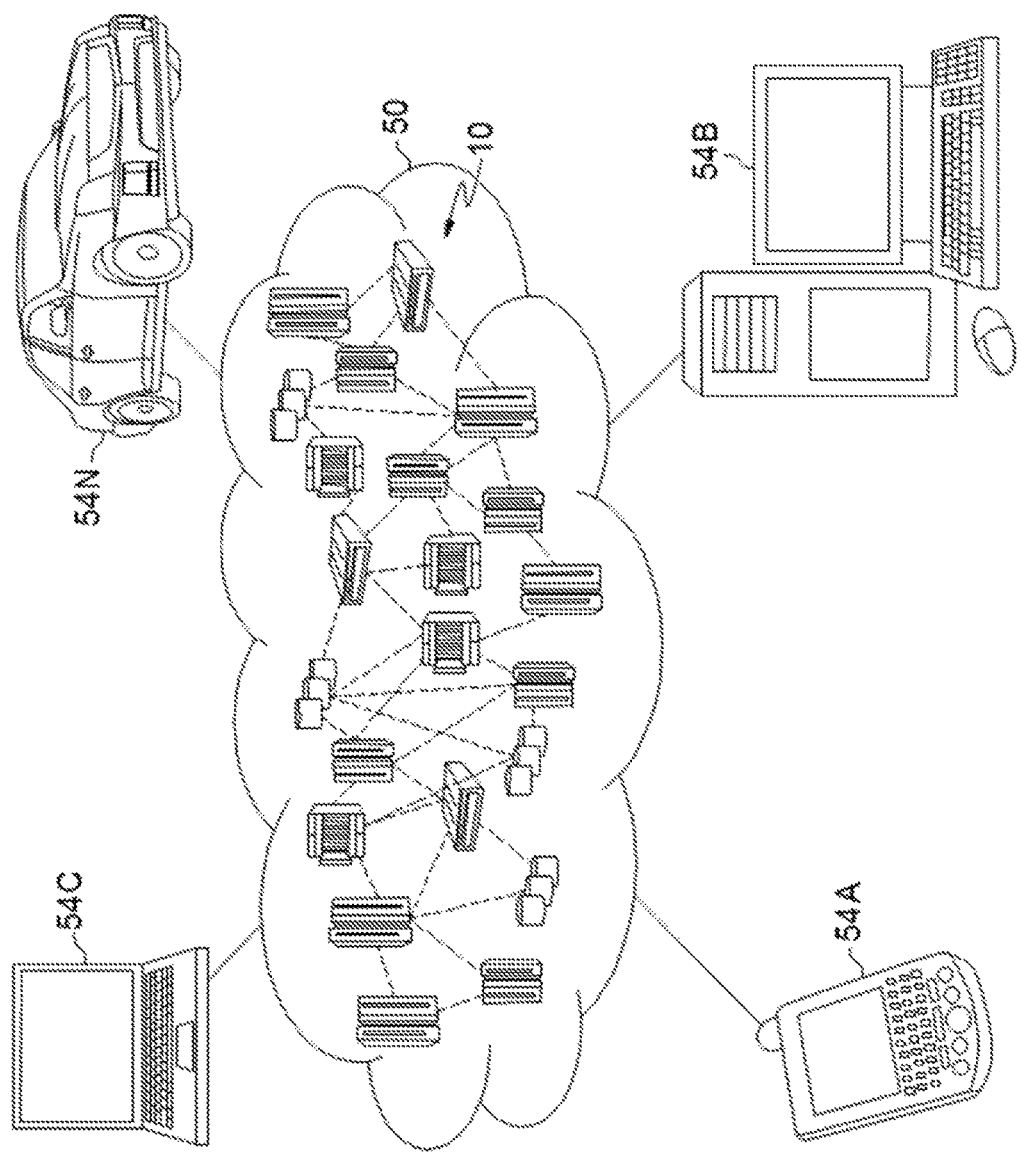
FIG. 4 depicts a cloud computing environment 50 according to another exemplary embodiment of the present invention.
Figure 5:
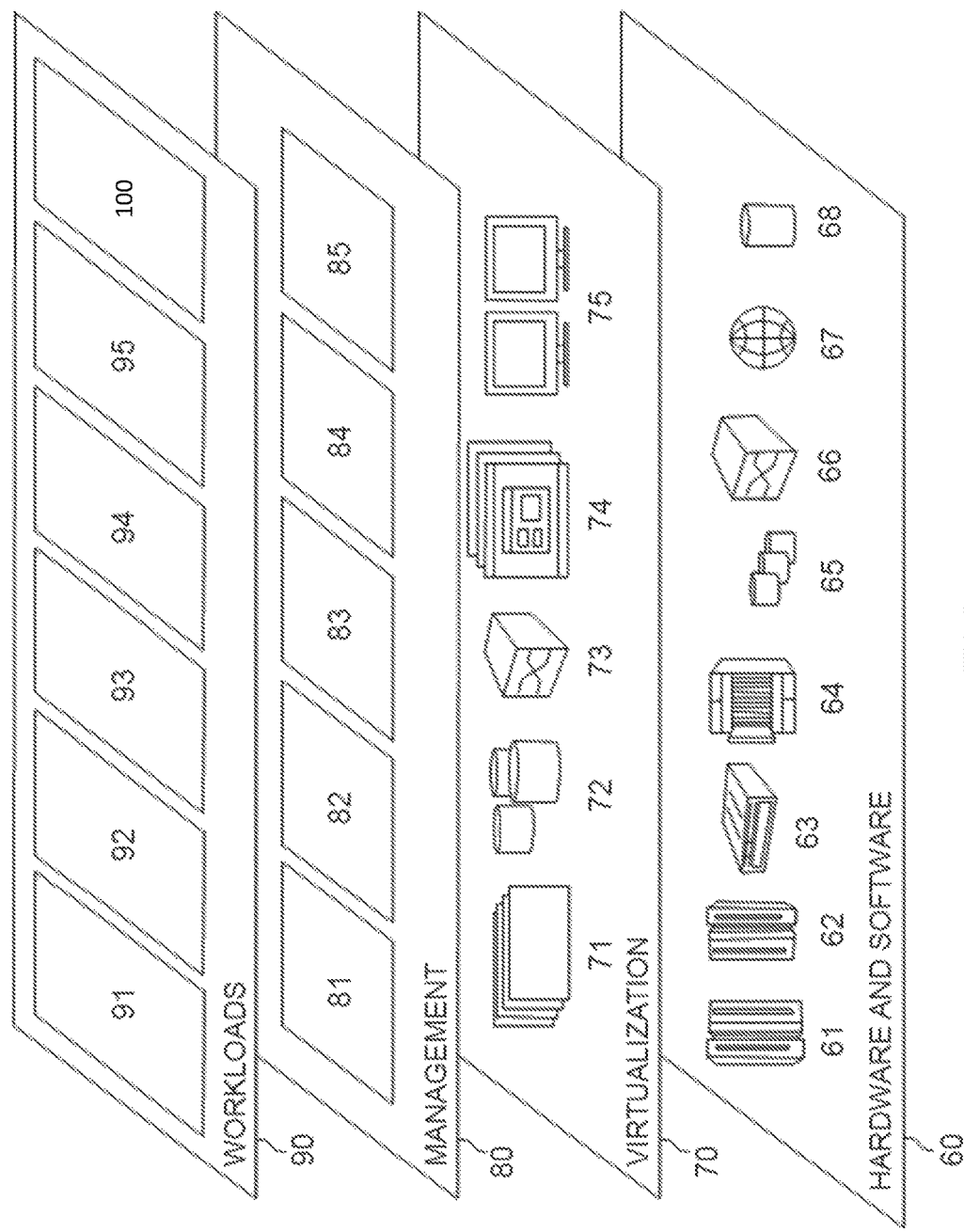
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the viewing technology system 100 (FIG. 5), it is noted that the present invention can be implemented outside of the cloud environment.

The user of the viewing technology system 100 wears a wearable (e.g., a head-mounted display (e.g., a display device 160)) such that a stereoscopic image (image) can be displayed to the user. The wearable is capable of collecting pupil data 130 and user data 150 including movements of the user body, head, eyes, etc. to be input to the system 100. Further, at least two drones, each having a camera mounted thereon, are coupled to the wearable to generate the stereoscopic image (video). In other words, the at least two drones are coupled in a closed-loop immersive viewing technology system. It is further noted that the stereoscopic image is preferably generated in real-time as a moving image (video) which the user can view as if the user is looking at the scenery at a scale to be described later (e.g., if the user's left and right eyes are the cameras of the drones). Also, the drones 'flight plan is controlled by control instructions 170 input by the user (e.g., via a joy-stick, motion sensor, etc.)

The viewing technology system 100 receives a scale input 120 from a user. That is, the user inputs a desired scale at which the user wants an image (video) to be displayed.

Based on the scale input 120, the drone separation calculating circuit 101 calculates an inter-drone distance that the two drones capturing the images via an onboard camera would need to be spaced apart to create the image at the desired scale. For example, if the scale input 120 is a 100:1 scale (S), then an inter-drone distance (D-drone) between the two drones capturing the images would need to be 100 times an inter-ocular distance between the pupils of the user (D-ocular) such that D-drone: D-Ocular=S. Therefore, if the user specified a 100:1 scale and the user's pupils are 6 inches apart, the drone separation calculating circuit 101 calculates that the distance between the two drones should be 50 feet.

The drone control circuit 102 controls the drones such that the drones are separated by the inter-drone distance according to the calculation of the drone separation calculating circuit 101. Thus, the two drones capture the images of the scenery at the inter-drone distance apart from each other to display the image at the scale requested by the user on the display device 160.

Also, the drone control circuit 102 receives user data 150 from the display device 160 such that the drone control circuit 102 controls the drones to move (or the cameras on the drones to move) according to the eye movement and/or to the body movement of the user. For example, if the user's head moves (or user orientation changes) such that user is gazing at a region in space not displayed on the image, the drone control circuit 102 causes the drones to change their flight path to display the region in space on the image. Or, the user's eyes can perform a ballistic-type movement (saccadic-type movement) that is outside of the image such that the drone control circuit 102 causes the drones to adjust their flight path to display the region at which the user is attempting to look.

Similarly, if the user is tracking an object on the image (e.g., using a tracking eye-type movement) and the tracked object is approaching a periphery of the displayed image such that the object will shortly not be displayed on the image (e.g., the object is within a threshold distance from an edge of the image), the drone control circuit 102 causes the drones to adjust the flight path to follow the tracking movement of the user's pupils. In other words, the drone control circuit 102 adjusts a flight path of the drones, while maintaining the inter-drone distance to achieve the desired scale, according to an eye movement and/or a body movement of the user.

The vergence angle determining circuit 103 determines a vergence angle of the pupils of the user relative to the image displayed on the display device 160 based on received pupil data 130 from the display device 160.

The image control circuit 104 controls a display of the image captured by the at least two drones on the display device 160 based on the vergence angle determined by the vergence angle determining circuit 103. That is, the image control circuit 104 controls the display of the image to provide an illusion of variable depth of field, color saturation, or other cues to reinforce a scale model illusion in which depth cues are mapped onto objects in the field of view to create a psychophysical 'just-noticeable-difference' (JND) typically associated with much closer objects. For example, the JND for objects in the near field of viewing under normal viewing conditions may be 3 inches. This means that objects at a three inches different distance are perceptibly different in their depth to the viewer. The JND for objects much farther from the viewer may on the other hand be tens of feet. This means objects are more difficult to discriminate when their distance difference is much larger. Using this invention, the JND for far objects matches the scale of the model illusion. Therefore, a JND of 100 feet may be reduced to 10 feet by use of this invention.

For example, if the vergence angle changes to indicate that the user is gazing from an object in the foreground at 1 mile away to an object in the background at 10 miles away of the image on the display device 160, the image control circuit 104 can cause certain pixels in the foreground to be blurred to give the illusion of depth. Alternatively, the image control circuit 104 can change a color saturation of the image to give the illusion of depth change based on the vergence angle changing. Furthermore, the separation between drones allows the two images to include stereoscopic cues that would otherwise be absent when the same scene was viewed at the normal separation between the eyes. In this way also, the JND is decreased by use of the invention.

Image control by the image control circuit 104 based on vergence angle can be stored in the database 140 such that at a next time that the vergence angle determining circuit 103 determines a same vergence angle, the image control circuit 104 can apply the same image control to the image.

The scale adjusting circuit 105 adjusts the scale of the image of the display device 160 based on a second scale input 120 from the user. That is, the scale adjusting circuit 105 causes the drone separation circuit 101 to calculate a new inter-drone distance for the drones to be spaced apart to give the desired scale. The drone control circuit 102 controls the drone's flight path to be at the new inter-drone distance apart. Thus, the drones would be controlled to move further along lines of parallax/vergence in order to adjust the image to the new scale smoothly. This would have the effect of causing the user perception to be that of the model landscape growing or shrinking. Such a change can be under remote users' control (e.g., a knob on the display device or a new scale input 120). Similarly, telescopic lenses might shrink or grow the model scale S, if the focal plane of the images and the mapping of new virtual drone position is consistent with the new simulated inter-ocular distance.

In one embodiment, a virtual world representation may be optionally employed, computed, or presented by the image control circuit 104 when the drones cannot achieve (or is unobtainable (or until they can achieve)) the appropriate inter-drone distance, or until a second drone is available, or when the information is saved as a virtual world representation for later replay. Thus, the image on the display device 160 can present a more natural feel to the user instead or eliminate a wait time of a display while the drones are controlled by the drone control circuit 102.

Also, based on movements of the body, head, and eyes, the image control circuit 104 can provide a transition period scene to the user (e.g., darkness, an advertisement, etc.) while the drones achieve the new position relative to the scene and resume relaying binocular scenes to the display device 160. For example, if the user rotates their body one-hundred and eighty degrees, the drones will take time to re-adjust the flight path to be traveling in opposite direction in which the image control circuit 104 can present a transition period scene to the user while the drone control circuit 102 causes the drones to take the new flight path. Or, the image control circuit 104 can employ the virtual world representation during the transition period, a temporary switching to both eyes receiving a feed from a single drone, a scene interpolation, etc.

Although the system 100 has been described using two drones, the system 100 can utilize a swarm of drones such that the drone control circuit 102 can select another drone or pair of drones to meet the inter-drone distance, to achieve an image having a particular vergence angle, or by the scale adjusting circuit 105 to adjust to the new scale. For example, a swarm of drones can be utilized such that multiple drones spread in flight formation at a predefined increment between the initial inter-drone distance and larger inter-drone distances to achieve different scales. Thus, the scale adjusting circuit 105 can trigger pairs of drones in succession from the current inter-drone distance to the needed inter-drone distance to achieve the scale to give a more natural scaling effect to the user. Also, pairs of complementary drones could be deployed in the drone swarms, at different inter-drone distances and at the same time as the first pair of drones to provide the user with multiple magnifications of the model view (for instance, wide angle or zoom).

Further, the vergence angle needs may trigger the deployment, call for, or temporary use of another drone in the swarm. That is, some vergence angles may require a different type of lens or camera on a drone. The drone swarms can include drones having different types of the lens, cameras, capabilities, etc.

Although the embodiments described herein have generally referred to aerial flight, the drones may be used underwater (e.g. for viewing underwater wrecks, marine life, topographic features from tidal zones to the deepest points on the ocean floor, etc.). The drones may provide extra illumination based on the environment conditions such as night time, deep water viewing, etc.

In one embodiment, the drone flying information/parameters may not only be specified by the user, but by a second party, a collaboration of a crowd, etc. using control instructions 170. The control instructions 170 may also be automatically generated based on the assessment of a task (e.g., land survey vs search/rescue), or depend on weather information and lighting, and can also be shaped by a user's ability to handle and assimilate varying degrees of stereopsis.

The control instructions 170 can also be programmed to perform an instructional setting, such as when there are two users, and one person is showing the other certain information (e.g. a military officer training a new recruit, hiker showing a region of woods, etc.).

It is noted that the viewing technology system 100 can used for agricultural surveillance, emergency response, surveying, law enforcement, search and rescue, real estate assessment or promotion, animal tracking, border crossing surveillance, traffic observation, etc.

The image control circuit 104 can further receive from the control instructions 170 an artificial intelligence (AI) module that can cause the image control circuit 104 to perform particular image controls at certain times or near certain items in the image such that a feature of importance that may need a user's attention can be emphasized. An on-screen message can be displayed when the image control circuit 104 is performing a control outside of the user data 150 and the pupil data 130 such that the user is aware of the change of flight plan or scale.

The database 140 can include encryption instructions to encrypt certain images or void out regions of an image such as a military base for a civilian user. The image control circuit 104 can cause the images to be modified based on geo-positional data of the user with the intra-drone distance, scale, and vergence angle to automatically change or trigger the security or encryption level of images sent to the display device 160.

In one embodiment, the user of the system can include an artificial agent (e.g., a computer) such that the drones can retrieve images at different scales and the imaging control circuit 104 can store image controls in the database 140 based on predetermined vergence angles such that the artificial agent can generate and store the virtual world representation in the database 140.

Although the scale adjusting circuit 105 was described as adjusting a scale based on a new user input, the scale adjusting circuit 105 can act to pre-emptively correct the inter-drone distance to maintain a current scale based on turbulence, thermal data, weather, etc.

It is noted that the vergence angle and the inter-ocular distance of a user can be stored such that multiple users can user a same device (e.g., a training session with multiple users swapping the headset around).

Figure 2:
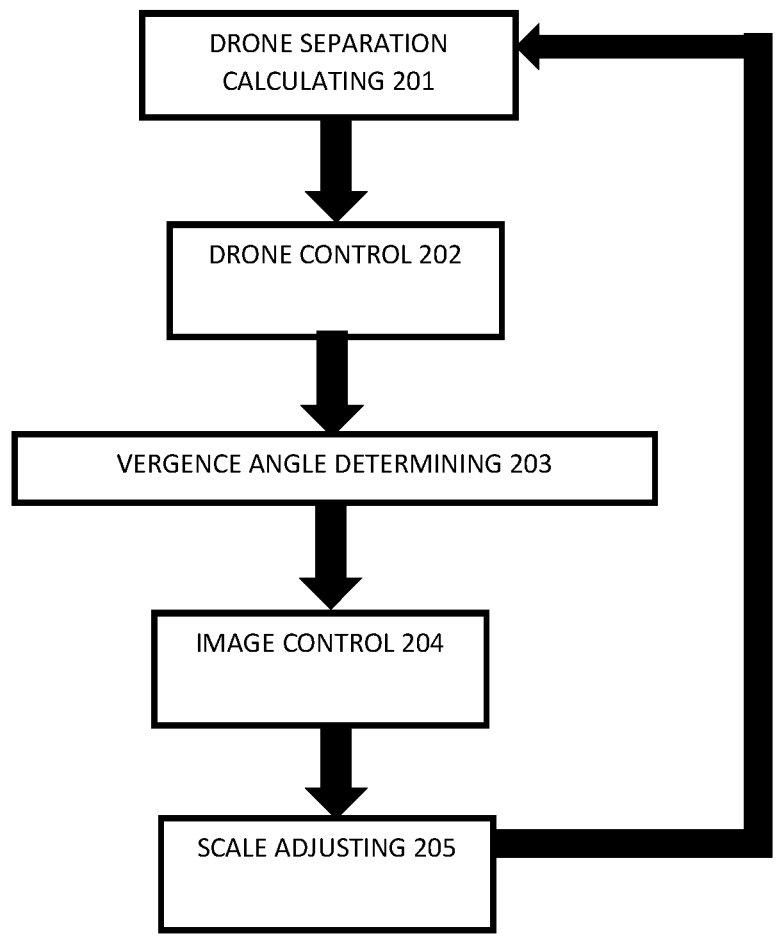
FIG. 2 exemplarily shows a high level flow chart for a viewing technology method 200.

FIG. 2 shows a high level flow chart for a method 200 of viewing technology.

Based on the scale input 120, Step 201 calculates an inter-drone distance that the two drones capturing the images via an onboard camera would need to be spaced apart to create the image at the desired scale.

Step 202 controls the drones such that the drones are separated by the inter-drone distance according to the calculation of the drone separation calculating circuit 101. Thus, the two drones capture the images of the scenery at the inter-drone distance apart from each other to display the image at the scale requested by the user on the display device 160.

Also, Step 202 receives user data 150 from the display device 160 such that Step 202 controls the drones to move according the eye movement and/or the body movement of the user. That is, Step 202 adjusts a flight path of the drones, while maintaining the inter-drone distance to achieve the desired scale, according to an eye movement and/or a body movement of the user.

Step 203 determines a vergence angle of the pupils of the user relative to the image displayed on the display device 160 based on received pupil data 130 from the display device 160.

Step 204 controls a display of the image captured by the at least two drones on the display device 160 according to the vergence angle determined by Step 203. That is, Step 204 controls the display of the image to provide an illusion of variable depth of field, color saturation, or other cues to reinforcing a scale model illusion in which depth cues are mapped onto objects in the field of view to create a psychophysical 'just-noticeable-difference'.

Step 205 adjusts the scale of the image of the display device 160 based on a second scale input 120 from the user. That is, Step 205 causes Step 201 to calculate a new inter-drone distance for the drones to be spaced apart to give the desired scale. Then, Step 202 controls the drone's flight path to be at the new inter-drone distance apart.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the viewing technology system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A viewing technology system including a display device associated with a user and at least two drones having an image capturing device, the system comprising:
    a drone separation calculating circuit configured to calculate an inter-drone distance between the at least two drones to create an image at a predetermined scale based on a relationship between the inter-drone distance and an inter-ocular distance between pupils of the user;
    a drone control circuit configured to control a flight path of the at least two drones by changing the flight path of the at least two drones to set the at least two drones at a new flight path such that the drones are separated by the inter-drone distance;
    a vergence angle determining circuit configured to determine a vergence angle of the pupils of the user relative to the image displayed on the display device;
    an image control circuit configured to control a display of the image on the display device according to the vergence angle to cause the image to create a just-noticeable-difference in the image; and
    a scale adjusting circuit configured to adjust the predetermined scale of the image based on a second scale input to the system by the user by causing the drone separation calculating circuit to calculate a new inter-drone distance for the at least two drones according to the second scale and causing the drone control circuit to control the flight path of the at least two drones to be separated by the new inter-drone distance,
    wherein the scale adjusting circuit causes the drone control circuit to control the flight path of at least two drones to be separated by the new inter-drone distance by moving the drones along lines of parallax by moving each drone a same amount along the lines of parallax at a same time from the inter-drone distance to the new inter-drone distance such that the user perceives the image to be growing or shrinking by maintaining a ratio between the inter-drone distance and the new inter-drone distance while the drones are moving from the inter-drone distance to the new inter-drone distance.

2. The system of claim 1, wherein the image control circuit creates the just-noticeable-difference to provide a scale model illusion image of variable depth of field.

3. The system of claim 1, wherein the display device comprises a head-mounted display worn by the user.

4. The system of claim 1, wherein the drone control circuit further controls the at least two drones to change the flight path based on a body movement of the user detected by the display device while maintaining the inter-drone distance.

5. The system of claim 1, wherein the drone control circuit further controls the at least two drones to change the flight path based on an eye movement of the user detected by the display device while maintaining the inter-drone distance.

6. The system of claim 1, wherein if the display device detects a tracking eye-type movement and a tracked object of the tracking eye-type movement is within a predetermined distance of a periphery of the image, the drone control circuit controls the at least two drones to change the flight path to capture the image in a direction of the tracking eye-type movement.

7. The system of claim 1, wherein the image control unit changes a color saturation of the image to create the just-noticeable-difference.

8. The system of claim 4, wherein the image control circuit causes a transition period scene to be displayed on the display device until the flight path of the at least two drones is finished changing.

9. The system of claim 1, wherein the image control circuit generates a virtual world representation image stored in a database if the inter-drone distance is unobtainable.

10. The system of claim 1, wherein the image control circuit generates a virtual world representation image depicting the image at the predetermined scale stored in a database until the flight path of the at least two drones reaches the inter-drone distance.

11. The system of claim 1, wherein the system includes a swarm of drones such that the at least two drones are interchangeable with other drones of the swarm of drones.

12. The system of claim 11, wherein the at least two drones are swapped with a drone in the drone swarm based on at least one of the vergence angle and the inter-drone distance.

13. The system of claim 1, wherein the image control circuit causes the images to be modified to omit a portion of the image based on geo-positional data of the user, the inter-drone distance, the predetermined scale, and the vergence angle according to a security setting.

14. A viewing technology method including a display device associated with a user and at least two drones having an image capturing device, the method comprising:
calculating an inter-drone distance between the at least two drones to create an image at a predetermined scale based on a relationship between the inter-drone distance and an inter-ocular distance between pupils of the user;
controlling a flight path of the at least two drones by changing the flight path of the at least two drones to set the at least two drones at a new flight path such that the drones are separated by the inter-drone distance;
determining a vergence angle of the pupils of the user relative to the image displayed on the display device;
controlling a display of the image on the display device according to the vergence angle to cause the image to create a just-noticeable-difference in the image; and
adjusting the predetermined scale of the image based on a second scale input to the system by the user by causing the calculating to calculate a new inter-drone distance for the at least two drones according to the second scale and causing the controlling to control the flight path of the at least two drones to be separated by the new inter-drone distance,
wherein the adjusting causes the controlling to control the flight path of at least two drones to be separated by the new inter-drone distance by moving the drones along lines of parallax by moving each drone a same amount along the lines of parallax at a same time from the inter-drone distance to the new inter-drone distance such that the user perceives the image to be growing or shrinking by maintaining a ratio between the inter-drone distance and the new inter-drone distance while the drones are moving from the inter-drone distance to the new inter-drone distance.

15. The method of claim 14, wherein the controlling the display creates the just-noticeable-difference to provide a scale model illusion image of variable depth of field.

16. A non-transitory computer-readable recording medium recording a viewing technology program including a display device associated with a user and at least two drones having an image capturing device, the program causing a computer to perform:
calculating an inter-drone distance between the at least two drones to create an image at a predetermined scale based on a relationship between the inter-drone distance and an inter-ocular distance between pupils of the user;
controlling a flight path of the at least two drones by changing the flight path of the at least two drones to set the at least two drones at a new flight path such that the drones are separated by the inter-drone distance;
determining a vergence angle of the pupils of the user relative to the image displayed on the display device;
controlling a display of the image on the display device according to the vergence angle to cause the image to create a just-noticeable-difference in the image; and
adjusting the predetermined scale of the image based on a second scale input to the system by the user by causing the calculating to calculate a new inter-drone distance for the at least two drones according to the second scale and causing the controlling to control the flight path of the at least two drones to be separated by the new inter-drone distance,
wherein the adjusting causes the controlling to control the flight path of at least two drones to be separated by the new inter-drone distance by moving the drones along lines of parallax by moving each drone a same amount along the lines of parallax at a same time from the inter-drone distance to the new inter-drone distance such that the user perceives the image to be growing or shrinking by maintaining a ratio between the inter-drone distance and the new inter-drone distance while the drones are moving from the inter-drone distance to the new inter-drone distance.

17. The system of claim 1, wherein each drone moves the same amount along the lines of parallax such that the display of the image is not distorted during movement.

18. The system of claim 1, wherein the display of the image follows a tracking eye-type movement of the user.

19. The system of claim 18, wherein if the display device detects the tracking eye-type movement and a tracked object of the tracking eye-type movement is within a predetermined distance of a periphery of the image, the drone control circuit controls the at least two drones to change the flight path to capture the image in a direction of the tracking eye-type movement.

20. The system of claim 1, wherein the image control circuit controls the display of the image to provide an illusion of variable depth of field and color saturation to reinforce a scale model illusion in which depth cues are mapped onto objects in the field of view to create the just-noticeable-difference.

\* \* \* \* \*